United States Patent [19]

Gloor

[11] 4,437,526
[45] Mar. 20, 1984

[54] MILLING TOOL FOR FORMING RECESSES IN MASONRY, CONCRETE AND SIMILAR MATERIAL STRUCTURES

[75] Inventor: Peter Gloor, Zollikerberg, Switzerland

[73] Assignee: Hilti Aktiengesellschaft, Schaan, Liechtenstein

[21] Appl. No.: 327,045

[22] Filed: Dec. 3, 1981

[30] Foreign Application Priority Data

Dec. 8, 1980 [DE] Fed. Rep. of Germany ....... 3046190

[51] Int. Cl.³ ............................................. E21B 9/24
[52] U.S. Cl. .................................. 175/346; 175/376; 409/143; 125/5
[58] Field of Search ........................... 125/5; 409/143; 175/376, 345, 346; 411/344

[56] References Cited

U.S. PATENT DOCUMENTS

| | | | |
|---|---|---|---|
| 664,140 | 12/1900 | Forsyth | 175/345 |
| 1,758,647 | 5/1930 | Burrell | 125/5 |
| 1,773,408 | 8/1930 | Rolfsen | 125/5 |
| 1,801,265 | 4/1931 | Copelin | 175/346 |
| 1,954,166 | 4/1934 | Campbell | 175/376 |
| 2,671,381 | 3/1954 | Carlson | 409/143 |
| 2,784,482 | 3/1957 | Emmons | 125/5 |
| 3,403,594 | 10/1968 | Newell | 411/344 |

FOREIGN PATENT DOCUMENTS 1027519  5/1953  France ................................. 125/5

Primary Examiner—Harold D. Whitehead
Attorney, Agent, or Firm—Toren, McGeady and Stanger

[57] ABSTRACT

A milling tool for forming recesses, such as an undercut in a borehole, in masonry, concrete and similar material structures includes a tool shaft with a bearing pin extending outwardly from one end of the shaft and with the axis of the pin offset eccentrically to the axis of the tool shaft. A freely rotatable annular milling head is positioned on and encircles the bearing pin. The outside surface of the milling head has cutting edge members.

8 Claims, 4 Drawing Figures

MILLING TOOL FOR FORMING RECESSES IN MASONRY, CONCRETE AND SIMILAR MATERIAL STRUCTURES

SUMMARY OF THE INVENTION

The present invention is directed to a milling tool for the production of recesses in masonry, concrete and similar material structures. The milling tool includes a tool shaft and a milling head incorporating cutting edge members.

To produce undercuts in previously drilled boreholes, which are usually cylindrical, a known drilling tool is made up of a tool shaft with a milling head positioned on one end. The axis of the tool shaft is located off-center of the milling head and the head is fixed to the shaft. The surface of the milling head is formed as a cutter for removing the material to form the undercut.

In the undercutting operation, the milling tool is rotated by a conventional motor-driven apparatus. Initially, the milling tool is inserted into a borehole drilled into a structure and, as it is rotated, the cutting edge on the milling head removes material from the surface of the borehole and enlarges its diameter providing an undercut.

Experience has shown with this known apparatus that an insufficient amount of material is removed and the undercut is not sufficiently concentric with the axis of the cylindrical borehole. Another of its main problems involves the handling of the tool, because the milling head rotating in the previously formed borehole, due to its eccentric arrangement, causes an intermittent radial shifting of the head. Such a condition is especially noted when the diameter of the borehole is equal to or only slightly greater than the radial extension of the milling head.

In the removal of material to form an undercut, the operator must counteract the radial shifting of the tool shaft with a corresponding counterforce. Since the shifting forces occur intermittently in sudden bursts, they have a tiring effect on the operator and, in consequence, a reduction in the efficiency in the formation of the undercut. Moreover, the form of the recess cut by the milling tool is determined by the operator with the result that the undercut is larger in one direction than another, because each operator in applying a counterforce does so in his own individual manner resulting in an unbalanced formation of the undercut.

Therefore, it is the primary object of the present invention to provide a milling tool especially suitable for undercutting in boreholes and noted for its high rate of material removal along with its ease in handling.

In accordance with the present invention, an annular milling head is positioned on a bearing pin offset eccentrically relative to the axis of the tool shaft. The milling head is freely rotatable about the bearing pin.

With the milling head formed as an annular member, a plurality of cutting edges can be provided on its outside surface permitting a high rate of material removal. Advantageously, the cutting edges can be spaced at various angular distances from one another to facilitate a uniform and optimum removal of the material. In place of cutting edges, it is also possible to provide carbide or hard metal granules or carbide particles as the cuttting bodies in the outside surface of the milling head.

To produce an undercut using the milling head so that the operator is not required to apply a counterforce, the milling head is freely rotatably mounted on a bearing pin which extends outwardly from one end of the tool shaft with the axis of the pin disposed parallel to and offset from the axis of the tool shaft. In practice, the bearing pin can be part of the tool shaft or of the milling head. With the axis of the bearing pin disposed eccentrically relative to the axis of the tool shaft, when the tool shaft is rotated, the milling head is also rotated and runs along the wall of the previously drilled borehole cutting out the desired undercut. The bearing pin can project into a bore or axially extending opening located centrally or eccentrically in a bearing part of the milling head. When there is a central bore with the usual play within the milling head bearing relative to the bearing pin, the removal of material is accomplished by a kind of rolling of the milling head on the surface defining the cylindrical borehole. The depth of the undercut is determined by the operator. If, on the other hand, the bearing pin projects into an eccentrically arranged bore in the milling, the result of the rotation of the tool shaft on the milling head, due to the moment of inertia and the centrifugal force generated, causes a radial deflection of the milling head around the bearing pin. Since the bearing pin is also eccentrically arranged, with the rotation of the tool shaft, the milling head also shifts around the tool shaft axis so that the radially deflected milling head presses against the surface of the borehole and carves out the undercut. Due to the centrifugal force developed with the continued removal of material, the milling head is deflected further in the radial direction for achieving the desired undercut depth. Accordingly, there is a uniform or even removal of material around the borehole with high removal efficiency, but without the operator being exposed to radially directed blows or force. Advantageously, a reverse drive member acts on the milling head, such a member can be in the form of a spring, so that when the tool shaft is at rest, the milling head automatically returns to and is held in the normal starting position.

This described embodiment is suitable for a wide range of undercut diameters and for the removal of both soft and hard materials. Moreover, a milling head of comparatively small bulk is also suitable for removing materials of a wide hardness range, particularly for smaller diameter cuts.

To drive the milling head, it is advantageous if the interior cross-section of the milling head bearing is larger than the corresponding cross-section of the bearing pin and if the envelope curve formed by the eccentrically offset bearing exceeds the interior cross-section of the milling head bearing at least at one location. The envelope curve is the curve formed, as the tool shaft is rotated, by the point on the bearing pin circumference which is spaced the greatest distance from the center of the tool shaft.

With the milling head bearing having an interior cross-section larger than that of the bearing pin, it permits the free rotatability of the milling head and also a degree of radial mobility of the milling head relative to the bearing pin. As the tool shaft rotates, the bearing pin rotates at the same speed around the axis of the tool shaft. Because of the larger interior cross-section of the milling head bearing, during rotation, the bearing pin contacts those locations in the bore through the milling head bearing which project into the area circled by the envelope curve. Such contact occurs in the rotational direction of the tool shaft with the milling head rotating in the same direction and receiving certain impact forces which tend to rotate it in approximate synchronism with the tool shaft. As a result, the milling head executes both a rotating action around the center of the tool shaft and around its own axis.

If the head of the milling tool is inserted into a predrilled cylindrical borehole, the cutting edges on the head, due to its rotation around the tool shaft axis, impact at different locations around the surface of the borehole with the energy of the milling head effecting a removal of the material in which the borehole is formed so that an undercut is created.

The projection of the envelope curve outwardly beyond the surface of the milling head bearing can be achieved in two ways. In one way the contour of the bore within the milling head bearing can—due to the radial shifting within the interior cross-section—fall on a circle circumscribed by the envelope curve. In another way the locations on the milling head bearing beyond which the envelope curve projects are part of a bore in which the minimum inside diameter is less than the diameter of the bearing pin plus the dimension of the twice the eccentric arrangement of the pin. Accordingly, the bearing pin contacts the inside surface of the milling head bearing and thereby drives the milling head without moving the milling head by external help into the range of effect of the bearing pin.

In another feature of the invention, the locations within the milling head bearing beyond which the envelope curve projects are part of a circular bore. As the bearing pin contacts the surface of such a bore, essentially tangential impact forces are applied against the milling head.

To provide a minimal slippage between the tool shaft and the milling head, it can be advantageous if the locations on the milling head bearing within the envelope curve are part of a polygonally shaped bore. Further, a four-sided cross sectional bore is particularly suitable.

To attain an optimum number of drive impulses for the milling head and to afford for the most diversified diameters of the milling head with smooth operation of the milling tool. which is compatible with good handling comfort, the eccentricity of the bearing pin is 5 to 25% of the working diameter of the milling head.

The milling tool embodying the present invention can also be used in masonry, concrete and similar material structures for forming groove-shaped recesses which serve to hold electrical conduits. For such an operation, the milling head can have cutting edges or the like on its front end face.

The milling tool can be driven by placing it into a hand-held tool of commercial size which provide a rotational drive. Such a hand-held tool can be driven electrically or by means of compressed air. Experience has shown that an especially high material removal efficiency can be attained in the high speed range, preferably in excess of 8000 rpm.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
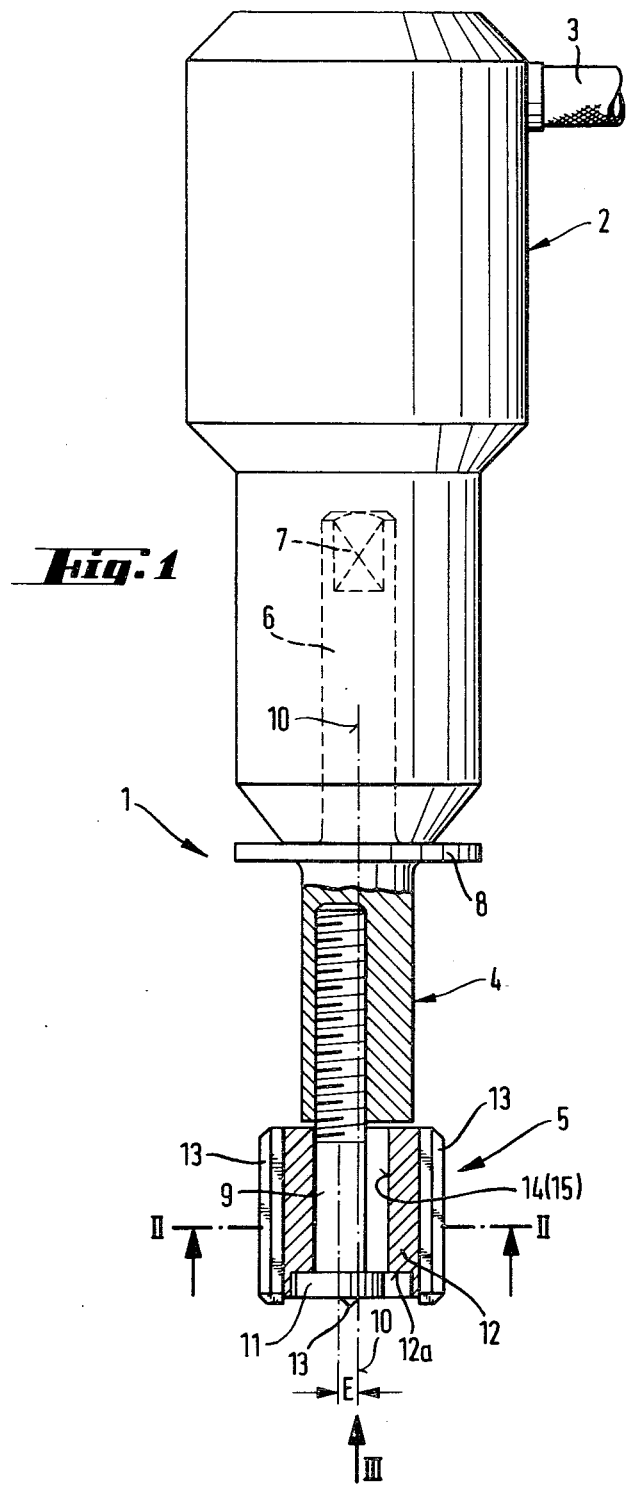
FIG. 1 is an elevational view, partly in section, of a milling tool, embodying the present invention, inserted into a drive unit.

In FIG. 1 the milling tool 1 is shown inserted into a drive unit 2. The drive unit 2 rotates the milling tool 1. In a conventional manner, the drive unit can be powered by compressed air supplied through a suitable feed pipe 3. Milling tool 1 is made up of a tool shaft 4 and an annular milling head 5.

Tool shaft 4 has a shank end 6 insertable into the drive unit and the end has working surfaces 7 for transferring the rotary movement from the drill unit to the shaft. An annular collar 8 projects outwardly from the shank end 6 and seats against a shoulder formed on the drive unit 2. A bearing pin 9 is screwed into the forward end of the tool shaft 4 and projects outwardly from the shaft. The axis of the bearing pin 9 is parallel with the axis of the shaft 4, however, the axis of the bearing pin is offset by an eccentric dimension E from the axis 10 of the tool shaft 4. Outwardly from the front end of the tool shaft 4, the pearing pin 9 extends through the milling head 5 and supports the milling head by means of a head 11 formed on the end of the bearing pin spaced outwardly from the tool shaft. The head 11 is located within a recess 12a in the end surface of the milling head spaced from the tool shaft. Milling head 5 includes an annular milling head bearing 12 with bar-shaped cutting members 13 inset into and projecting outwardly from the outside surface of the bearing. Further, these cutting members project slightly outwardly in the axial direction of the milling head from its front end face, that is the end face spaced from the tool shaft 4. As can be seen in FIG. 1 the cutting members projecting from the end face extend outwardly beyond the head 11 on the bearing pin 9. As a result, material can be removed by the milling head around its circumferential surface as well as at its front end face.

Figure 2:
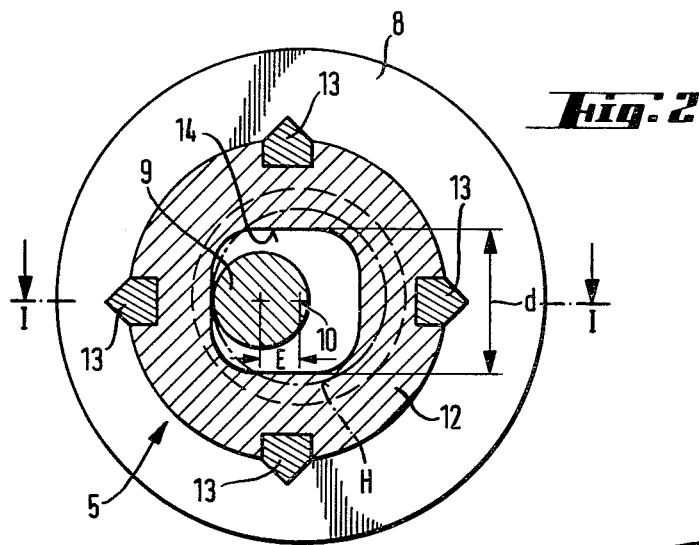
FIG. 2 is an enlarged cross-sectional view through the milling tool taken along the line II—II in FIG. 1.

As illustrated in FIG. 2, the milling head bearing 12 has an approximately square bore 14 for receiving the bearing pin 9. The minimum inside diameter d of bore 14 is considerably greater than the comparable diameter of the bearing pin 9. The minimum inside diameter d of the bore 14 is slightly less than the sum of the diameter of the bearing pin 9 and twice the eccentricity E. In turn, eccentricity E is about 10% of the working diameter of the milling head 5 defined by the cutting member 13 located diametrically opposite one another.

When the tool shaft 4 is rotated, the bearing pin 9 rotates about the axis 10 of the tool shaft and travels along a circular envelope curve H described by the point on the circumference of the bearing pin which is spaced the greatest distance from the tool shaft axis 10. As displayed in FIG. 2, envelope curve H is for the most part located outwardly from the surface defining the bore 14 of the milling head bearing 12.

Consequently, the bearing pin 9 rotated by the tool shaft 4 runs positively along the contour of the surface defining the bore 14, imparting a tangentially directed force against the milling head 5 so that the milling head rotates in the same direction as the tool shaft. When the milling head 5 is placed in a previously drilled borehole in a structure, and is rotated at high speed, its cutting members 13 impact in rapid succession on the surface of the borehole and carve out an undercut recess or groove. By suitably adjusting the diameter of the milling head with the borehole in which it forms the undercut, the tool shaft 4 can provide a good guidance and thus assure exact concentricity of the recess formed in the borehole. The braking action on the rotary movement of the milling head due to the formation of the undercut is compensated by the continuous application of tangential force applied in a rapid manner.

Figure 3:
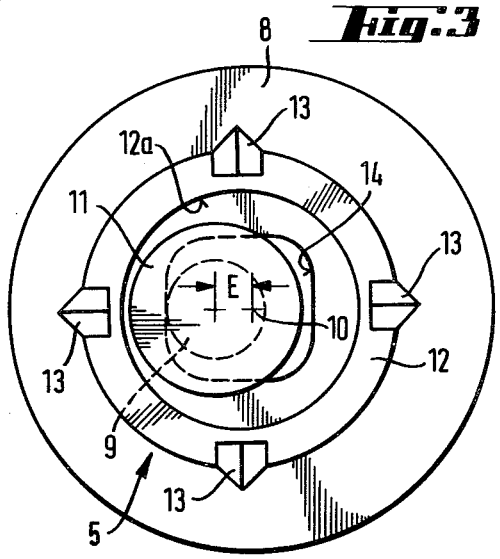
FIG. 3 is an enlarged view of the milling tool taken in the direction of the arrow III in FIG. 1.

It can be seen from the detail afforded in FIG. 3, that the head 11 on the bearing pin 9 is larger in diameter than the bore 14 so that the milling head 5 is secured against axial displacement from the tool shaft 4 and the bearing pin 9.

Figure 4:
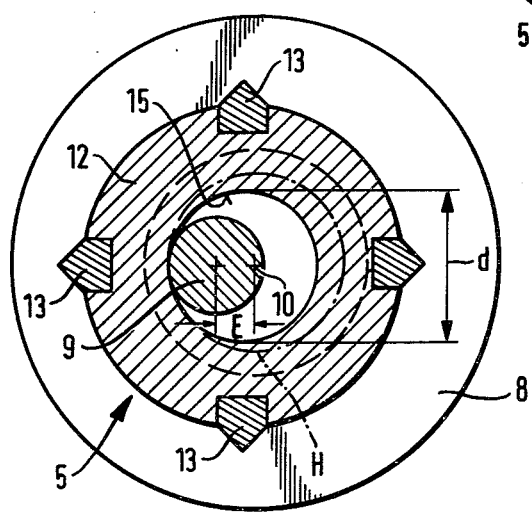
FIG. 4 is a view of the milling tool, similar to FIG. 2, however, with a different milling head bore cross-section.

A similar embodiment of the milling tool is shown in FIG. 4 differing from the tool illustrated in FIGS. 2 and 3 by the shape of the bore 15. In FIG. 4 the bore 15 is circular while in FIGS. 2 and 3 the bore 14 is approximately square. The other elements of the tool are the same as FIGS. 2 and 3, accordingly, the same reference numerals are used in FIG. 4. Further, the milling tool in FIG. 4 operates in the same manner as described above.

A particular advantage of the milling tool embodying the present invention is its ability to produce undercuts of a wide range of depths with a single tool being suitable for use in boreholes of a wide diameter range. Furthermore, the tool operator is not exposed to any significant impacting force whereby the tool is distinguished by its ease in handling.

While specific embodiments of the invention have been shown and described in detail to illustrate the application of the inventive principles, it will be understood that the invention may be embodied otherwise without departing from such principles.

I claim:

1. Milling tool for forming a recess, such as an undercut in a borehole, in structures made of masonry, concrete and similar materials, comprising an axially elongated tool shaft, a milling head mounted on said tool shaft, said milling head having cutting edge members located on the outside surface thereof, wherein the improvement comprises an axially elongated bearing pin extending axially outwardly from said tool shaft with the axis thereof disposed parallel to and offset laterally from the axis of said tool shaft, said milling head is mounted on an extends around said bearing pin outwardly from said tool shaft and said milling head is freely rotatable about said bearing pin, said milling head has a bore formed therein into which said bearing pin fits, the diameter of the bore in said milling head being greater than the outside diameter of said bearing pin, and the point on said bearing pin spaced most remote from the axis of said tool shaft defining, during rotation of said tool shaft, an envelope curve which projects beyond the cross-section of the bore within said milling head at least at one location, the dimension of the eccentricity of the axis of said bearing pin relative to the axis of said tool shaft is in the range of 5 to 25% of the working diameter of said milling head defined by the outside diameter of the cutting edge members on said milling head.

2. Milling tool, as set forth in claim 1, wherein said bore in said milling head has a minimum inside diameter smaller than the sum of the diameter of said bearing pin and the dimension of twice the eccentricity of said bearing pin relative to the axis of said tool shaft.

3. Milling tool, as set forth in claim 1 or 2, wherein the bore in said milling head has a circular cross-section.

4. Milling tools, as set forth in claims 1 or 2, wherein the bore in said milling head has a polygonal cross-section.

5. Milling tool, as set forth in claim 1, wherein a head is formed on the end of said bearing pin spaced axially outwardly from said tool shaft and said head has a diameter sufficient to secure said milling head against axial displacement from said bearing pin.

6. Milling tool, as set forth in claim 1, wherein said tool shaft having a shank end arranged to be fitted into a drilling unit for rotating said tool shaft.

7. Milling tool, as set forth in claim 1, wherein said cutting edge members are equiangularly spaced apart around the outside surface of said milling head and project outwardly from the outside surface of said milling bearing.

8. Milling tool, as set forth in claim 1, wherein said milling head comprises an annular milling head bearing mounting said cutting edge members, said milling head bearing having the bore therein arranged to receive said bearing pin located concentrically and with said bore having a larger diameter than said bearing pin.

* * * * *